United States Patent
Hilbig

[15] 3,655,009
[45] Apr. 11, 1972

[54] METHOD AND APPARATUS FOR SUPPRESSING THE NOISE OF A FAN-JET ENGINE

[72] Inventor: Jack H. Hilbig, Chula Vista, Calif.
[73] Assignee: Rohr Corporation, Chula Vista, San Diego, Calif.
[22] Filed: Sept. 18, 1969
[21] Appl. No.: 859,070

[52] U.S. Cl. ......................... 181/33 HC, 181/51, 239/127.3, 239/265.17
[51] Int. Cl. ..................................... B64d 33/06, F01n 1/14
[58] Field of Search ............... 181/43, 51, 33, 33.22, 33.221, 181/33.222; 239/127.3, 265.11, 265.13, 265.17

[56] References Cited

UNITED STATES PATENTS

| | | | |
|---|---|---|---|
| 2,426,833 | 9/1947 | Lloyd | 181/33 HC |
| 3,027,710 | 4/1962 | Maytner | 181/33 HC |
| 3,053,340 | 9/1962 | Kutney | 181/33 HC |
| 3,174,581 | 3/1965 | Duthion et al. | 181/33 HC |
| 3,262,264 | 7/1966 | Gardiner et al. | 239/127.3 |
| 3,390,837 | 7/1968 | Freeman | 239/265.17 |
| 3,432,100 | 3/1969 | Hardy et al. | 239/127.3 |
| 3,463,402 | 8/1969 | Langston | 181/33 HC |
| 3,527,317 | 9/1970 | Motsinger | 239/127.3 |

Primary Examiner—Robert S. Ward, Jr.
Attorney—George E. Pearson

[57] ABSTRACT

A tubular housing is disposed in spaced relation around the casing of a fan-jet engine and extends rearwardly therefrom. A convoluted ring is joined at its circular forward edge to the aft edge of the engine casing and is formed with lobes which extend axially thereof and increase in radial dimension in the downstream direction, so that the aft ends of the lobes project both radially inwardly from said engine casing and radially outwardly to the wall of said housing at the aft end of the latter. The forward edge of a nozzle is joined to the aft edge of the housing, and fan air of the engine flows through the space between the engine casing and the housing, through the spaces between the lobes, and into the nozzle. Exhaust gas of the engine flows from the engine into the passages bounded by the inner surfaces of the lobes and thence into the nozzle.

2 Claims, 2 Drawing Figures

PATENTED APR 11 1972 3,655,009

INVENTOR.
JACK H. HILBIG
BY Edwin D. Grant

ATTORNEY

METHOD AND APPARATUS FOR SUPPRESSING THE NOISE OF A FAN-JET ENGINE

SUMMARY OF THE INVENTION

This invention relates to jet-propelled aircraft and more particularly to a method and apparatus for reducing the noise created by aircraft having engines of the fan-jet type.

Part of the noise associated with the operation of jet-propelled aircraft results from the flow through the atmosphere of the high velocity exhaust gas discharged from the engine, or engines, of such aircraft. The amount of sound energy generated by streams of exhaust gas depends upon the temperature and velocity thereof. The present invention provides for the mixing of the high velocity, high temperature primary jet stream of a fan-jet engine with the relatively low velocity, low temperature fan air of said engine, which mixing is effected by a convoluted ring disposed between the aft end of the engine casing and a thrust nozzle associated therewith. The combined jet stream of exhaust gas and fan air which is discharged from the nozzle has a lower velocity than that of the exhaust gas when the latter is discharged as a separate stream, and the noise generated by passage of the combined jet stream through the atmosphere is thus less than that which is generated when the exhaust gas and fan air are discharged as separate streams. The combined jet stream also has a lower temperature than that of the exhaust gas, which further reduces the noise generated downstream from the propulsion assembly.

In the preferred embodiment of the invention a tubular housing is disposed in spaced relation around a fan-jet engine casing and projects rearwardly therefrom. A thrust nozzle is secured to the aft end of the housing, and a tube is mounted on the aft bearing housing of the engine drive shaft and extends to a point radially aligned with the junction of the housing and the thrust nozzle, the aft end of this tube supporting a cone, or plug, which extends into the forward portion of the throat of the thrust nozzle. A convoluted ring is joined at its circular forward edge to the aft edge of the engine casing, this ring being formed with a plurality of lobes which extend radially thereof and gradually increase in radial dimension in the downstream direction so that their aft ends project both radially inwardly from the engine casing and radially outwardly to the wall of the housing at the point where the nozzle is joined to the latter. Fan air of the engine passes through the space between the engine casing and the housing, and thence through the spaces between the lobes of the ring into the nozzle, while exhaust gas passes from the engine into the ring and flows through the lobes of the latter into the nozzle. Hence streams of fan air and streams of exhaust gas enter the nozzle in alternately disposed relation, each of said streams extending radially from the aforesaid cone at the aft end of the ring to the wall of the nozzle. These fan air and exhaust gas streams mix together in the nozzle and thus suppress the noise of operation of the jet engine assembly as described hereinbefore.

DETAILED DESCRIPTION

Figure 1:
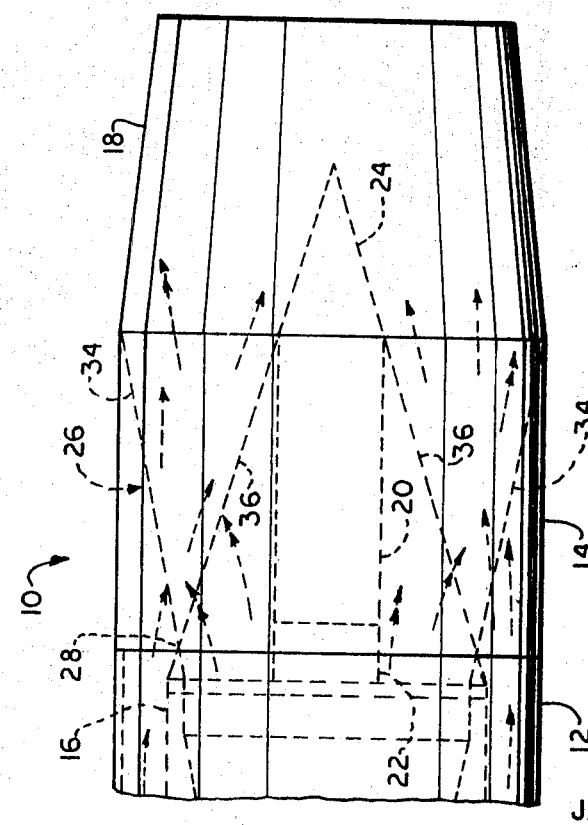
FIG. 1 is a side elevation of a preferred embodiment of this invention, the drawing illustrating in solid lines the rear portion of a housing which envelops a fan-jet engine and a thrust nozzle attached to the aft end of said engine, and illustrating in broken lines components which are disposed within said housing and nozzle.

As illustrated in FIG. 1, a preferred embodiment of the present invention comprises a tubular housing, or nacelle, which is generally designated by the number 10 and which is formed of a forward section 12 and an aft section 14 attached by suitable means to said forward section. Disposed within housing 10 is a jet engine the turbine casing 16 of which is illustrated in the drawing by broken lines. The housing is concentric with casing 16, and the space therebetween is connected with the fan section of the engine by means of ducts (not shown) so that it serves as a passage for the flow of fan air (represented by single-headed arrows in the drawings) to a frusto-conical thrust nozzle 18 mounted on the aft end of said housing. A tube 20 is fixedly attached to the aft bearing housing 22 of the drive shaft (not shown) of the engine, said tube extending rearwardly from said bearing housing in coaxial relation with housing 10 and terminating at the plane which includes the aft edge of the latter (which plane is perpendicular to the longitudinal axis of the housing). the base of a cone 24 is secured to the aft edge of tube 20, and the cone thus projects into the throat of nozzle 18.

Figure 2:
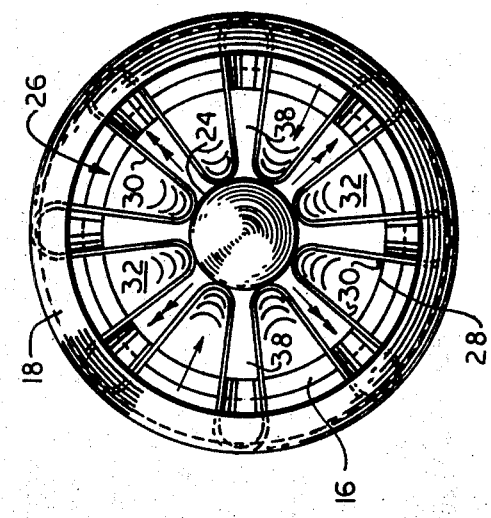
FIG. 2 is a rear view of the same embodiment.

The forward, circular edge of a convoluted ring, generally designated by the number 26, is fixedly joined to the aft edge 28 of casing 16, this ring being formed with a plurality of lobes 30 which are shown in end view in FIG. 2. The lobes gradually increase in radial dimension in the downstream direction, so that at the forward portion of the ring the valleys 32 between the lobes are shallow, whereas at the aft end of the ring said valleys are deep. Furthermore, the construction of the ring is such that its lobes project both radially inwardly and radially outwardly from the aft edge of casing 16 (as illustrated by the broken lines designated 34, 36 in FIG. 1), and the aft end of the lobes are fixedly secured by suitable means to the aft end of tube 20 and to the wall of housing 10 at the junction of the latter and nozzle 18. The convoluted aft edge of the ring lies in the plane which includes the aft edge of housing 10 and the aft edge of tube 20.

OPERATION

As illustrated by double-headed arrows in FIG. 1, exhaust gas of the engine within housing 10 is discharged into the forward, cylindrical end of ring 26 and is divided into separate streams which respectively flow through the passages 38 (see FIG. 2) bounded by the inner surfaces of lobes 30 of the ring. Thus streams of exhaust gas enter the throat of nozzle 18 in circumferentially spaced relation to one another, and these streams extend radially from cone 24 to the wall of the nozzle. Fan air (represented by single-headed arrows, as previously noted) flows through the spaces between lobes 30 and enter the nozzle in separate streams which are disposed in alternate relation between the aforedescribed streams of exhaust gas, said streams of fan air also extending radially from cone 24 to the wall of the nozzle. In FIG. 2 double-headed arrows indicate the flow of a portion of the exhaust gas outwardly toward the wall of housing 10 after said gas is discharged from the engine, and single-headed arrows indicate the flow of a portion of the fan air inwardly toward tube 20 after said fan air is discharged from the space between housing 10 and casing 16.

It will be clear from the foregoing description of one embodiment of the invention that the convoluted ring 26 causes exhaust gas and fan air to flow into the nozzle associated therewith in a manner which results in thorough mixing of said gas and air inside the nozzle, thus causing the noise which is generated by the combined jet stream discharged from said nozzle to be less than the noise which would be generated if the exhaust gas and fan air were permitted to flow through the atmosphere in separate streams. It will also be recognized that various changes and modifications could be made in the described and illustrated apparatus without departing from the concept of the invention. For example, in some embodiments of the invention tube 20 and cone 24 can be omitted without materially affecting the operation of the apparatus. Hence the scope of the invention should be considered to be limited only by the terms of the claims appended thereto.

What is claimed as new and useful and desired to be secured by U.S. Letters Patent is:

1. In a jet propulsion plane having a fan-jet engine, the combination comprising:

a tubular housing disposed in spaced relation around the aft portion of the casing of said engine and projecting beyond the aft edge thereof, fan air of said engine flowing through the space between said housing and said casing;

a convoluted ring the forward edge of which is fixedly joined to the aft edge of said casing, said ring being formed with lobes which extend axially thereof and gradually increase the radial dimension in the downstream direction so that their aft ends project both radially inwardly and radially outwardly from the aft edge of said casing, said lobes abutting the wall of said housing at the aft end of the latter; and a thrust nozzle the forward edge of which is fixedly joined to the aft edge of said housing, fan air of said engine flowing from the space between said housing and said casing into the spaces between the lobes of said ring and thence dividing therein for flow into said nozzle, the aft ends of the lobes of said ring being fixedly joined together so that exhaust gas of said engine flowing through the radially projecting passages bounded by the inner surfaces of said lobes and thence dividing therein for flow into said nozzle, whereby alternately disposed streams of fan air and exhaust gas enter the forward end of said nozzle.

2. The combination defined in claim 1 including:

a tube fixedly connected to the aft bearing housing of the drive shaft of said engine and extending rearwardly therefrom in coaxial relation with said housing, the aft ends of the lobes of said ring being fixedly joined to the aft end of said tube; and a cone the base edge of which is fixedly joined to the aft edge of said tube.

* * * * *